Patented Nov. 14, 1922.

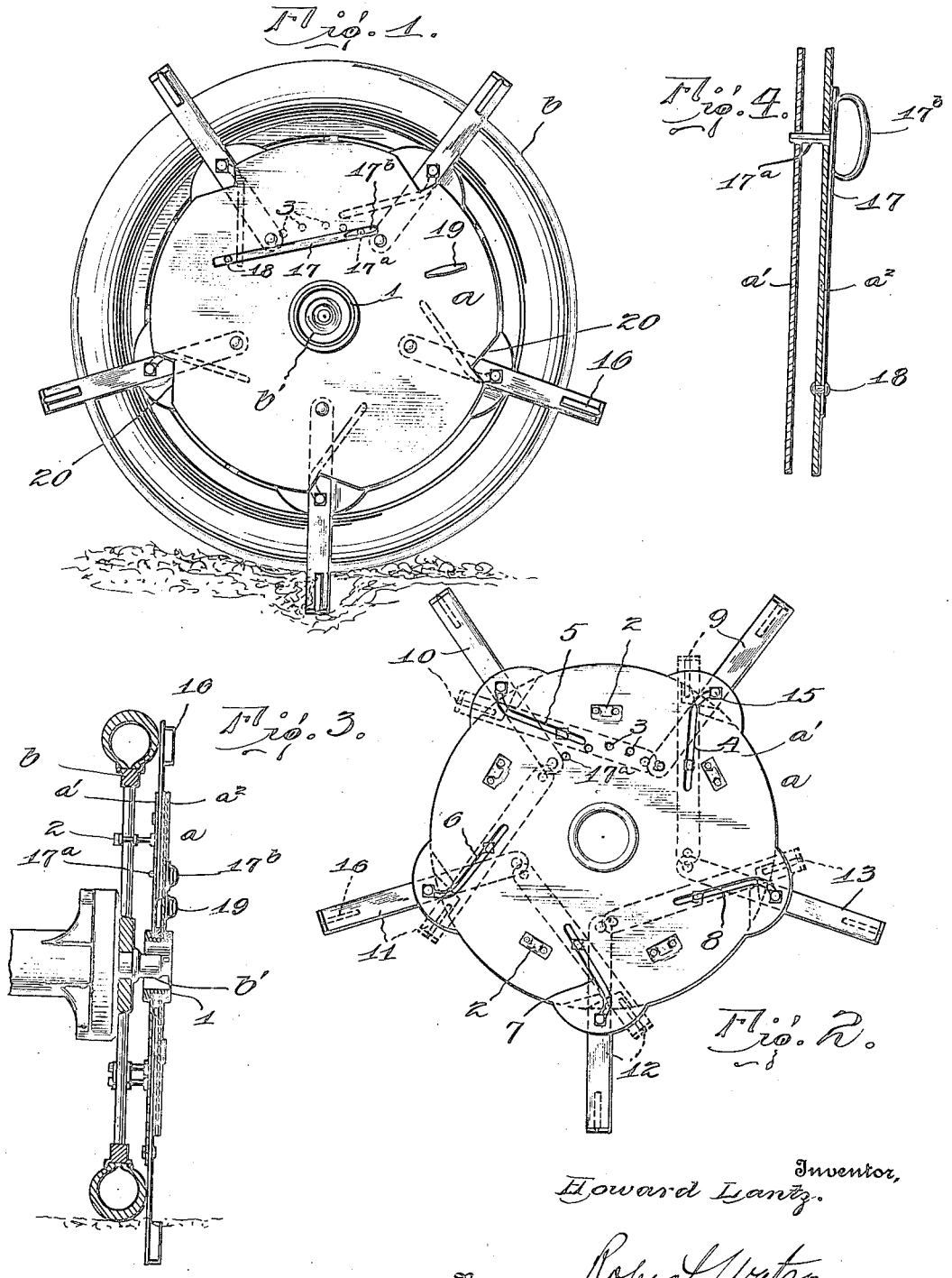

1,435,863

UNITED STATES PATENT OFFICE.

HOWARD LANTZ, OF FALLSTON, MARYLAND.

TRACTION ATTACHMENT FOR MOTOR VEHICLES.

Application filed April 17, 1922. Serial No. 553,713.

*To all whom it may concern:*

Be it known that I, HOWARD LANTZ, a citizen of the United States, residing at Fallston, in the county of Harford and State of Maryland, have invented certain new and useful Improvements in Traction Attachments for Motor Vehicles, of which the following is a specification.

This invention relates to traction devices applicable to the traction wheels of motor vehicles and adapted particularly for use in places where the ground to be traveled over is of a soft or wet and slippery nature. In carrying out the invention, I provide a pair of disks, pivotally connected together at their centers so that one may be rotated with respect to the other, and between these disks are arranged traction bars which are so connected to the disks that relative movement of the disks will cause the bars to be extended beyond the rim of the wheel, to engage the ground, or retracted to a position within the boundaries of the tire, according to the direction of rotation of one disk with respect to the other. I also provide means for locking the disks in various positions of adjustment so that the traction bars may be set to penetrate the ground deeply or slightly, or to be clear of the ground as may be desired, according to the character of the ground or roadway over which the vehicle may be moving.

In the accompanying drawing,

Fig. 1 is a side elevation of the traction attachment applied to a vehicle wheel, the traction bars being in their extended positions;

Fig. 2 is a similar view of the reverse side of the attachment;

Fig. 3 is a vertical central section through the wheel and attachment; and,

Fig. 4 is a detail showing the means for locking the disks.

Referring to the drawing, $a$ represents the attachment as a whole, and $b$ indicates a vehicle wheel to which the attachment is shown applied in Figs. 1 and 3. The attachment comprises two disks $a'$ and $a^2$, which are pivotally connected together at their centers by a sleeve 1. The disk $a'$ is provided with clamps 2 for its attachment to the spokes of the wheel, and when the device is in position the hub $b'$ of the wheel may project into the sleeve, as shown in Figs. 1 and 3. The disk $a'$, which may for convenience be termed the inner disk, is provided with an arcuate series of perforations 3, about midway between its center and circumference, and it is also provided with a plurality of guide slots, 4, 5, 6, 7, and 8, equally spaced apart and similar in form, each slot extending from a point adjacent the periphery of the disk inwardly the major portion of the slot being inclined with respect to radial lines running through its ends. Between the disks are arranged traction bars 9, 10, 11, 12, and 13, each traction bar being pivotally connected to the disk $a^2$, which may, for convenience, be termed the outer disk. As shown, the pivots 14 which connect the bars to the outer disk are at the same radial distance from the center of the disk and evenly spaced apart circumferentially of the disk. Each bar, at its central portion, is provided with a guide pin or projection 15, which engages the adjacent guide slot in the inner plate. The traction bars are flat, as shown, and lie in a plane parallel with the disks and are provided at their ends with lateral projections 16, for preventing the bars from slipping in the soil. A spring arm 17 is secured at one end by a rivet 18 to the outer disk and this arm is provided with a pin $17^a$, which extends through an opening in said outer disk and is adapted to engage in one of the series of openings 3, in the inner disk, for the purpose of locking the disks in various positions of adjustment. A handle $17^b$ is provided upon the spring arm for pulling the locking pin outward to disengage it from the openings 3. A handle 19 is also arranged at a convenient point on the outer disk for rotating the latter when the locking pin is disengaged. The operator, by pulling the handle $17^b$ outward with one hand may disengage the locking pin, and he may then move the disk about its axis by pulling or pushing on the handle 19 with the other hand.

In the several figures of the drawing, the traction bars are shown in their extended positions, in which they lie approximately radial to the axis of the disks, the folded positions of the bars being indicated in dotted lines in Fig. 2. It will be evident that when the outer disk is turned to the left in Fig. 1, the inner ends of the traction bars will be swung about their guide pins as fulcra, and the guide pins will move along the guide slots, and when these pins are at the inner ends of the slots, the bars will lie in the folded positions indicated in dotted lines in Fig. 2. In these folded positions, the bars will lie wholly within the circumference of the tire so that the latter can be removed from the wheel, if desired. By adjusting the disks so that the locking pins will engage intermediate openings 3 in the inner disk, the traction bars will be set to intermediate positions. Thus, the ends of the traction bars may be extended so that they will deeply engage the ground, as illustrated in Fig. 1, or they may be set so that they will engage the ground lightly, or not at all, as may be desired, according to the condition of the ground or roadway which is to be traveled over. The attachment is particularly desirable for running over fields or cultivated ground, and any other places where the ground is of such a nature that non-skid chains would be of little service. It is also very serviceable on roads or grounds which may be covered with deep snow or ice. The ends of the traction bars are preferably pointed, as shown, in order that they may readily penetrate the ground or dig into the ice or snow, and the form of the bars at their ends is such as to effectively prevent skidding or slipping of the wheels. The disks may be solid sheets of metal as shown, or they may be cut out and formed as desired so as to lighten the weight. I have shown the outer disk as having notches 20 at its periphery, but these are merely to prevent the projections 16 from engaging the outer disk in folding.

What I claim is:

1. A traction attachment for vehicle wheels comprising inner and outer disks pivotally connected together at their centers, traction bars between said disks, each bar pivotally connected at one end to the outer disk at a point approximately midway between the center and periphery of the latter and having a guide pin projecting from its central portion, and the inner disk having spaced guide slots engaged by said pins, each guide slot extending from a point adjacent the edge of the disk inwardly, the major portion of each slot being inclined with respect to radial lines passing through its ends, and means for locking the disks in various positions of adjustment.

2. A traction attachment for vehicle wheels comprising inner and outer disks pivotally connected together at their centers, traction bars between said disks, each bar pivotally connected at one end to the outer disk at a point approximately midway between the center and periphery of the latter and having a guide pin projecting from its central portion, and the inner disk having spaced guide slots engaged by said pins, each guide slot extending from a point adjacent the edge of the disk inwardly, the major portion of each slot being inclined with respect to radial lines passing through its ends, said inner disk having an arcuate series of perforations, and a spring-pressed pin on said outer disk adapted to engage said perforations.

3. A traction attachment for vehicle wheels comprising inner and outer disks pivotally connected together at their centers, traction bars between said disks, each bar pivotally connected at one end to the outer disk at a point approximately midway between the center and periphery of the latter and having a guide pin projecting from the central portion, and the inner disk having spaced guide slots engaged by said pins, each guide slot extending from a point adjacent the edge of the disk inwardly, the major portion of each slot being inclined with respect to radial lines passing through its ends, said inner disk having an arcuate series of perforations, a spring-pressed pin on said outer disk adapted to engage said perforations, and a handle on the outer disk for turning the same.

In testimony whereof I affix my signature.

HOWARD LANTZ.